J. S. VAN BUREN.
Stove-Grates.
No. 139,934.  Patented June 17, 1873.
Fig. 1.
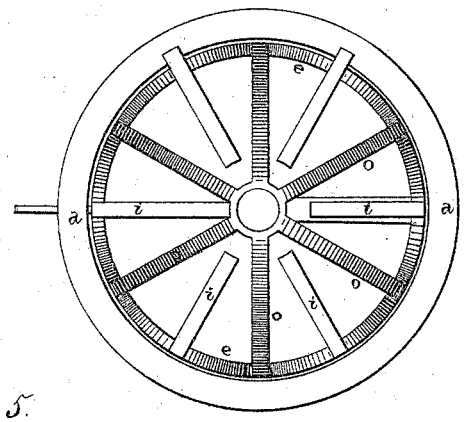
Fig. 5.
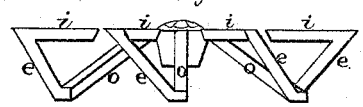
Fig. 2.
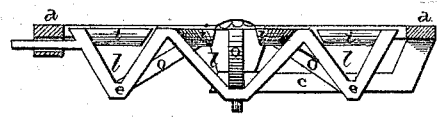
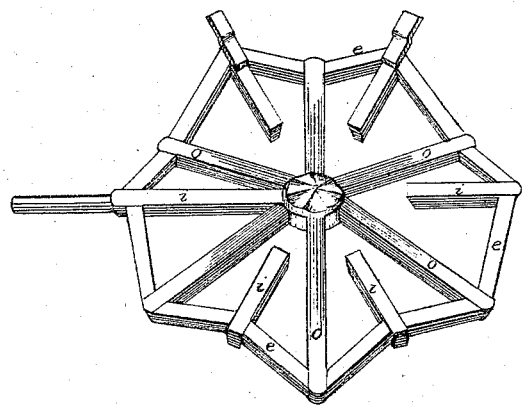
Fig. 3.
WITNESSES.
Horace Wey
W. G. Kindig
INVENTOR.
J. S. Van Buren
per
F. A. Lehmann
Atty.

UNITED STATES PATENT OFFICE.

JAMES S. VAN BUREN, OF TROY, NEW YORK.

IMPROVEMENT IN STOVE-GRATES.

Specification forming part of Letters Patent No. 139,934, dated June 17, 1873; application filed March 20, 1873.

*To all whom it may concern:*

Be it known that I, JAMES S. VAN BUREN, of Troy, in the county of Rensselaer and State of New York, have invented certain new and useful Improvements in Grates; and I do hereby declare the following to be a full, clear, and exact description of the invention, such as will enable others skilled in the art to which it pertains to make and use it, reference being had to the accompanying drawings which form part of this specification.

The nature of my invention relates to an improvement in grates; and consists in a rim having attached to it two sets of bars, one set extending horizontally toward the center while the other slants downward from it, being placed on a lower level so as to form triangular openings in the side of the rim, through which the clinkers will fall by simply shaking the grate.

Figure 1 represents a plan view of my grate. Fig. 2 is a side elevation of the same. Fig. 3 is a perspective of the grate. Fig. 5 is a side elevation of the grate, showing only two bars at a time bound together.

$a$ represents the base-plate of the stove having secured to it the arm or rest $c$, upon which the grate is pivoted. This grate consists of a rim $e$, to which are attached two sets of bars, $i\ o$, the bars $i$ being placed on a plane with the plate $a$, and extending inward toward the center, to which they may or may not be secured, just as is most desirable, and are placed above the bars $o$. The bars $o$ slant downward from the center toward the rim, and being depressed below the horizontal bars $i$ the rim in order to connect the two, is serrated, as shown in Fig. 2, forming the triangular spaces $l$ between them, which serve as side openings for the discharge of clinkers. By means of these side openings the clinkers and ashes can be thoroughly cleaned from the stove by simply shaking the grate, and thus prevent the trouble and annoyance of so often having to clean out the whole stove.

Instead of making the edge continuous, as here shown, part of it may be removed, only having two bars at a time bound together; or the bars may diverge from the center without having their ends connected, and form the same openings.

Having thus described my invention, what I claim as new, and desire to secure by Letters Patent, is—

1. A grate having two sets of bars diverging from or near the center at different angles, so as to form side openings at the edge for the discharge of clinkers, substantially as specified.

2. The serrated edge, in combination with the bars $i\ o$, when arranged substantially as shown and described.

3. A grate having two sets of bars, which diverge from the center or near the center, one set being placed on a horizontal line and the other depressed below it, so that the edge which binds them together shall be serrated, substantially as shown and described.

In testimony that I claim the foregoing I have hereunto set my hand this 11th day of March, 1873.

J. S. VAN BUREN.

Witnesses:
J. RICHARD ROSSMAN, M. D.,
WM. TOUGH.